United States Patent
Petrou et al.

(10) Patent No.: US 9,581,226 B2
(45) Date of Patent: Feb. 28, 2017

(54) BARREL CAM RUDDER PEDAL SYSTEM

(71) Applicants: Anton A. Petrou, Hawthorn Woods, IL (US); Maciej J. Piotrowski, Harwood Heights, IL (US)

(72) Inventors: Anton A. Petrou, Hawthorn Woods, IL (US); Maciej J. Piotrowski, Harwood Heights, IL (US)

(73) Assignee: Woodward MPC, Inc., Skokie, IL (US)

( * ) Notice: Subject to any disclaimer, the term of this patent is extended or adjusted under 35 U.S.C. 154(b) by 85 days.

(21) Appl. No.: 14/721,754

(22) Filed: May 26, 2015

(65) Prior Publication Data

US 2016/0348772 A1 Dec. 1, 2016

(51) Int. Cl.
*B64C 13/04* (2006.01)
*F16H 25/12* (2006.01)

(52) U.S. Cl.
CPC ............. *F16H 25/12* (2013.01); *B64C 13/04* (2013.01)

(58) Field of Classification Search
CPC ......... B64C 13/04; B64C 13/06; B64C 27/56; E04H 17/22; E04H 12/2269; E02D 27/42
USPC ................ 74/560; 244/235; 403/61, 82, 116
See application file for complete search history.

(56) References Cited

U.S. PATENT DOCUMENTS

| | | | |
|---|---|---|---|
| 8,353,484 B2 | 1/2013 | Gardner | |
| 2014/0131523 A1 | 5/2014 | Carner | |

*Primary Examiner* — Victor MacArthur
(74) *Attorney, Agent, or Firm* — Reinhart Boerner Van Deuren P.C.

(57) ABSTRACT

A barrel cam rudder pedal system is provided. The system includes an outer housing with a chassis assembly carried by the outer housing. A barrel cam arrangement is rotationally mounted within an interior space of the chassis assembly. A pair of pedal assemblies is mechanically coupled to the barrel cam arrangement such that linear movement of either of the pair of pedal assemblies results in a rotation of the barrel cam arrangement about a central longitudinal axis defined by the barrel cam arrangement.

20 Claims, 8 Drawing Sheets

BARREL CAM RUDDER PEDAL SYSTEM

FIELD OF THE INVENTION

This invention generally relates to flight control systems in fixed wing and rotary wing aircraft, and more particularly to pedal assemblies for the control of a rudder of said aircraft.

BACKGROUND OF THE INVENTION

Pedal assemblies situated in the pilot and co-pilot stations of a cockpit of an aircraft are typically utilized to control the yaw of the aircraft. These assemblies can include a pair of pedals wherein depression of one pedal will cause the aircraft to yaw in a given direction, and cause the other pedal of the pair of pedals to move in the opposite direction of the depressed pedal by a defined ration, e.g. a 1:1 ratio. These assemblies can also incorporate artificial feel mechanisms to provide pilot feedback, as well as automatic centering and position sensing. Further the pedal assembly in the pilot station can be linked to the co-pilot station such that pedal actuation in one station is mimicked at the other station. Yet further, the pedals themselves may be adjustable for ergonomic purposes to accommodate pilots of differing size.

To achieve such rudder control, the mechanical connection between the pedals of one station, the mechanical connection between one pedal assembly and the other pedal assembly, and the adjustability of the pedals for ergonomic purposes, historically involves a series of linkages extending above and/or below the floor of the cockpit to allow for a fixed pivot point for all rudder and adjustment inputs. Such a configuration unfortunately requires a large envelope of space, and increases the difficulty of rapidly and efficiently changing out a pedal assembly in a maintenance event.

More contemporary designs have overcome the aforementioned drawbacks by providing the entire pedal system module above the floor of the aircraft. Even in this configuration, a significant amount of cockpit space is required to accommodate the pedal mechanism above the floor. Indeed, as one example, a parallel tube configuration may be utilized wherein two tubes are arranged such that one is above the other with their longitudinal axes lying in the same plane. The pedals are linked to the tubes, typically by way of a four bar mechanism. The upper tube provides for the adjustment of the pedal position for ergonomic purposes, while the lower tube is mechanically coupled to the pedals such that it transfers motion from one pedal to the other pedal and from one station to the other station. An example of such a configuration may be seen at U.S. Pat. No. 8,353,484, the entire teachings and disclosure of which is incorporated by reference thereto.

The aforementioned parallel tube configuration provides for a complete line replaceable unit situated above the floor. However, there is a continuing trend for decreases in space envelope, weight, and cost of such pedal assemblies, as well as increases in the overall ergonomics of such pedal assemblies. As such, there is a need in the art for a rudder pedal assembly which provides a rapidly replaceable system having a reduced space envelope, weight, and cost of implementation.

The invention provides such a rudder pedal assembly. These and other advantages of the invention, as well as additional inventive features, will be apparent from the description of the invention provided herein.

BRIEF SUMMARY OF THE INVENTION

In one aspect, the invention provides a rudder pedal system that advantageously incorporates a barrel cam arrangement which allows for a substantial reduction in system size, weight, and cost. An embodiment of this aspect includes an outer housing and a chassis assembly carried by the outer housing. A barrel cam arrangement is rotationally mounted within an interior space of the chassis assembly. A pair of pedal assemblies is mechanically coupled to the barrel cam arrangement such that linear movement of either of the pair of pedal assemblies results in a rotation of the barrel cam arrangement about a central longitudinal axis defined by the barrel cam arrangement.

The barrel cam arrangement may include a barrel cam having a bore therethrough and a translation tube extending through the bore. The barrel cam includes a pair of cam grooves symmetrically arranged on the barrel cam about a center longitudinal axis thereof.

Each pedal assembly includes a carriage with a cam follower projecting therefrom. The cam follower of one pedal assembly is slidably received in one of the cam grooves. The cam follower of the other pedal assembly is slidably received in the other one of the cam grooves. Each cam groove follows an arcuate path along the length of the barrel cam. Each carriage carries at least one upper wheel, and at least one lower wheel.

The chassis assembly includes an upper rail and a lower rail on a first side of the chassis assembly, and an upper rail and a lower rail on a second side of the chassis assembly. The at least one upper wheel of each pedal assembly is respectively in rolling contact with the upper rails. The at least one lower wheel is respectively in rolling contact with the lower rails.

The system can also include an adjustment mechanism disposed within the outer housing for adjusting a position of the pair of pedal assemblies relative to the outer housing. The adjustment mechanism is mounted within an interior space of the translation tube. The adjustment mechanism is coupled to the barrel cam such that it is operable to adjust a linear position of the barrel cam relative to the translation tube.

In another aspect, the invention provides a rudder pedal system that presents a more ergonomic configuration than prior designs by providing a substantially linear pedal path. An embodiment according to this aspect includes an outer housing and a chassis assembly within the outer housing. The chassis assembly includes an upper and a lower rail on each of opposed sides of the chassis assembly. The system also includes a pair of pedal assemblies. One of the pair of pedal assemblies is in rolling contact the upper and lower rails on one side of the opposed sides of the chassis assembly. The other one of the pair of pedal assemblies is in rolling contact with the upper and lower rails on the other one of the opposed sides of the chassis assembly. The system also includes a barrel cam arrangement rotationally mounted within an interior space of the chassis assembly. Each of the pair of pedal assemblies is mechanically coupled to the barrel cam arrangement.

The pair of pedal assemblies mechanically coupled to the barrel cam arrangement such that linear movement of either of the pair of pedal assemblies results in a rotation of the barrel cam arrangement about a central longitudinal axis defined by the barrel cam arrangement.

The system can also include a sensor arrangement operably connected to the barrel cam arrangement to detect a rotation of the barrel cam arrangement about a central longitudinal axis of the barrel cam arrangement.

The system can also include a centering mechanism operably connected to the barrel cam arrangement to return the barrel cam arrangement to a neutral position from a rotated position about a central longitudinal axis of the barrel cam arrangement.

The system can also include a dampening mechanism operably connected to the barrel cam arrangement to dampen a rotation of the barrel cam arrangement about a central longitudinal axis of the barrel cam arrangement.

According to this aspect, the barrel cam arrangement includes a barrel cam having a bore therethrough and a translation tube extending through the bore. The barrel cam includes a pair of cam grooves symmetrically arranged on the barrel cam about a center longitudinal axis thereof Each cam groove follows an arcuate path along the length of the barrel cam.

In yet another aspect, the invention provides a method of manufacturing a rudder pedal system. An embodiment according to this aspect includes providing an outer housing and providing a chassis assembly within the outer housing. The method also includes providing a barrel cam arrangement within an interior space of the chassis assembly by rotationally mounting the barrel cam arrangement to the chassis assembly. The method also includes mechanically coupling a pair of pedal assemblies to the barrel cam arrangement such that linear movement of either of the pair of pedal assemblies results in a rotation of the barrel cam arrangement about a central longitudinal axis defined by the barrel cam arrangement. The step of providing the barrel cam arrangement includes providing a barrel cam having a bore therethrough and a translation tube extending through the bore.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, FIGS. 1-8 illustrate an exemplary embodiment of a barrel cam rudder pedal system referred to herein as pedal system 20. Pedal system 20 overcomes existing problems in the art by providing a compact module that may be rapidly installed and/or replaced as needed. This compact module is positioned entirely above the cockpit floor and is thus easily accessible. As will be explained in greater detail below, these advantages are achieved in part by utilizing a novel barrel cam mechanical linkage which takes up significantly less space than the contemporary parallel tube designs discussed above.

Figure 1:
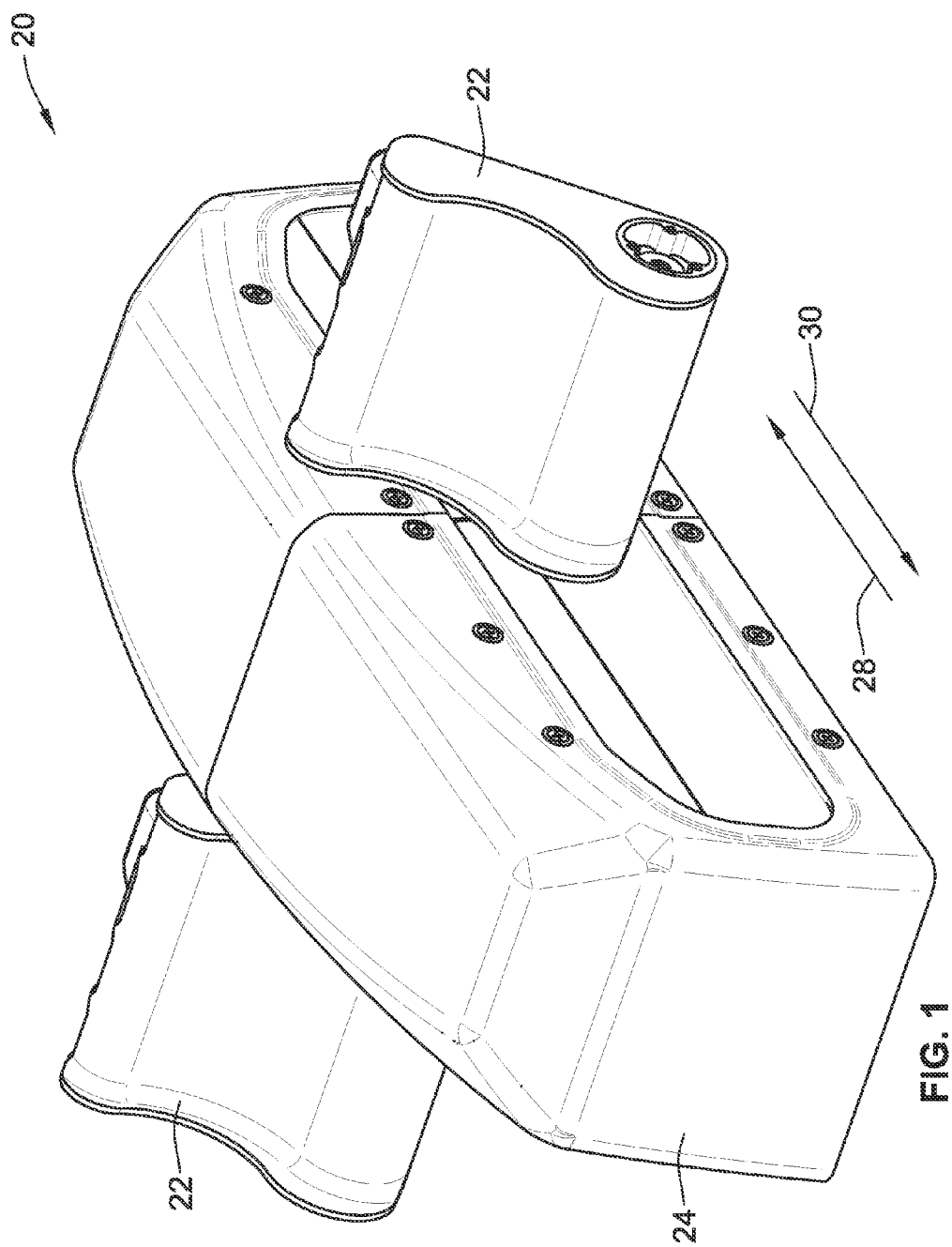
FIG. 1 is a perspective view of an embodiment of a barrel cam rudder pedal assembly according to the teachings of the present invention.

With particular reference now to FIG. 1, pedal system 20 includes a pair of pedal assemblies 22 mounted on opposed sides of a housing 24. Pedal assemblies 22 are movable in first and second linear directions 28, 30 to effectuate the position of the control surfaces of a rudder of an aircraft in a fly-by wire type arrangement.

Figure 2:
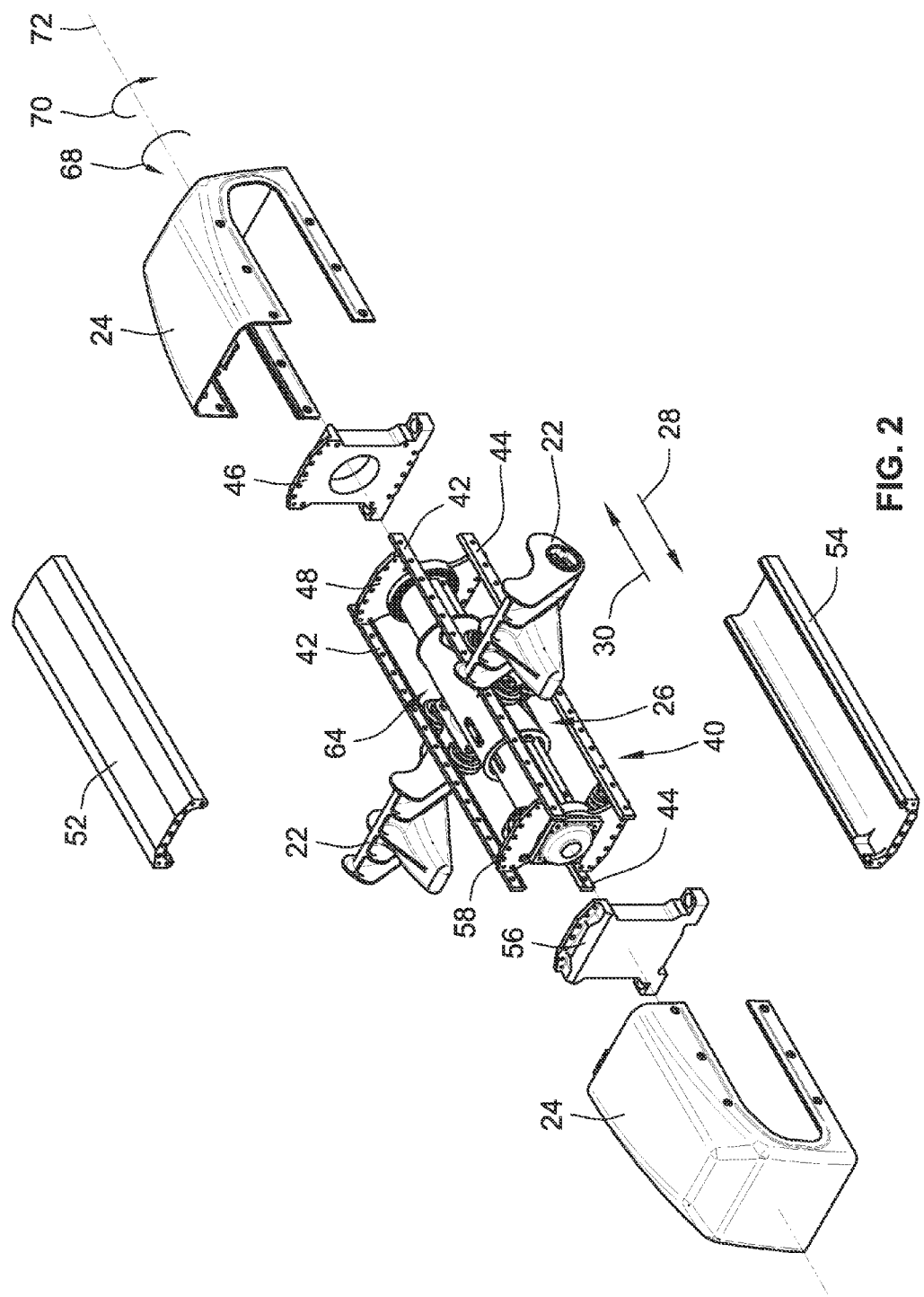
FIG. 2 is a perspective exploded view of the pedal assembly of FIG. 1.

Turning now to FIG. 2, the same illustrates pedal system 20 in an exploded view. Pedal system 20 includes a chassis assembly 40 contained within housing 24. Chassis assembly 40 includes an upper rail 42 and a lower rail 44 on each side of chassis assembly 40 as illustrated. A first outer end plate 46 and a first inner end plate 48 are positioned generally at one end of chassis assembly 40 as shown. Likewise, a second outer end plate 56 and second inner end plate 58 are positioned at an opposed end of chassis assembly 40 as shown. A top chassis plate 52 extends between first and second inner end plates 48, 58 and is fastened thereto. A bottom chassis plate 54 also extends between first and second inner end plates 48, 58 and is fastened thereto. First and second outer end plates 46, 56 are fastened to first and second inner end plates 48, 58. Upper and lower rails 42, 44 are in turn fastened to first and second outer end plates 46, 56.

As a result, chassis assembly 40 provides for a rigid frame structure which supports a barrel cam arrangement 26 that is rotationally mounted within an interior space 64 of chassis assembly 40. Each pedal assembly 22 is mechanically linked to barrel cam arrangement 26 as will be described in greater detail below. This linkage is such that movement of one pedal assembly in first linear direction 28 causes an equal and opposite movement of the other pedal assembly in second linear direction 30 and vice versa.

Movement of the left-most pedal assembly 22 shown in FIG. 2 in first linear direction 28 will cause barrel cam arrangement 26 to rotate about its central longitudinal axis 72 in rotational direction 68 as shown. Movement of the right-most pedal assembly 22 shown in FIG. 2 in first linear direction 28 will cause barrel cam arrangement 26 to rotate about its central longitudinal axis 72 in rotational direction 70 as shown. These rotations of barrel cam arrangement 26 about its central longitudinal axis 72 are detected by a sensor arrangement which will be described in greater detail below.

These rotations are then converted to a signal which is ultimately utilized to effectuate a change in rudder position in a fly-by wire type arrangement. Additionally, it will be recognized by those of skill in the art that this mechanical linkage provided by barrel cam arrangement 26 is far more compact and efficient than contemporary parallel tube designs.

Figure 3:
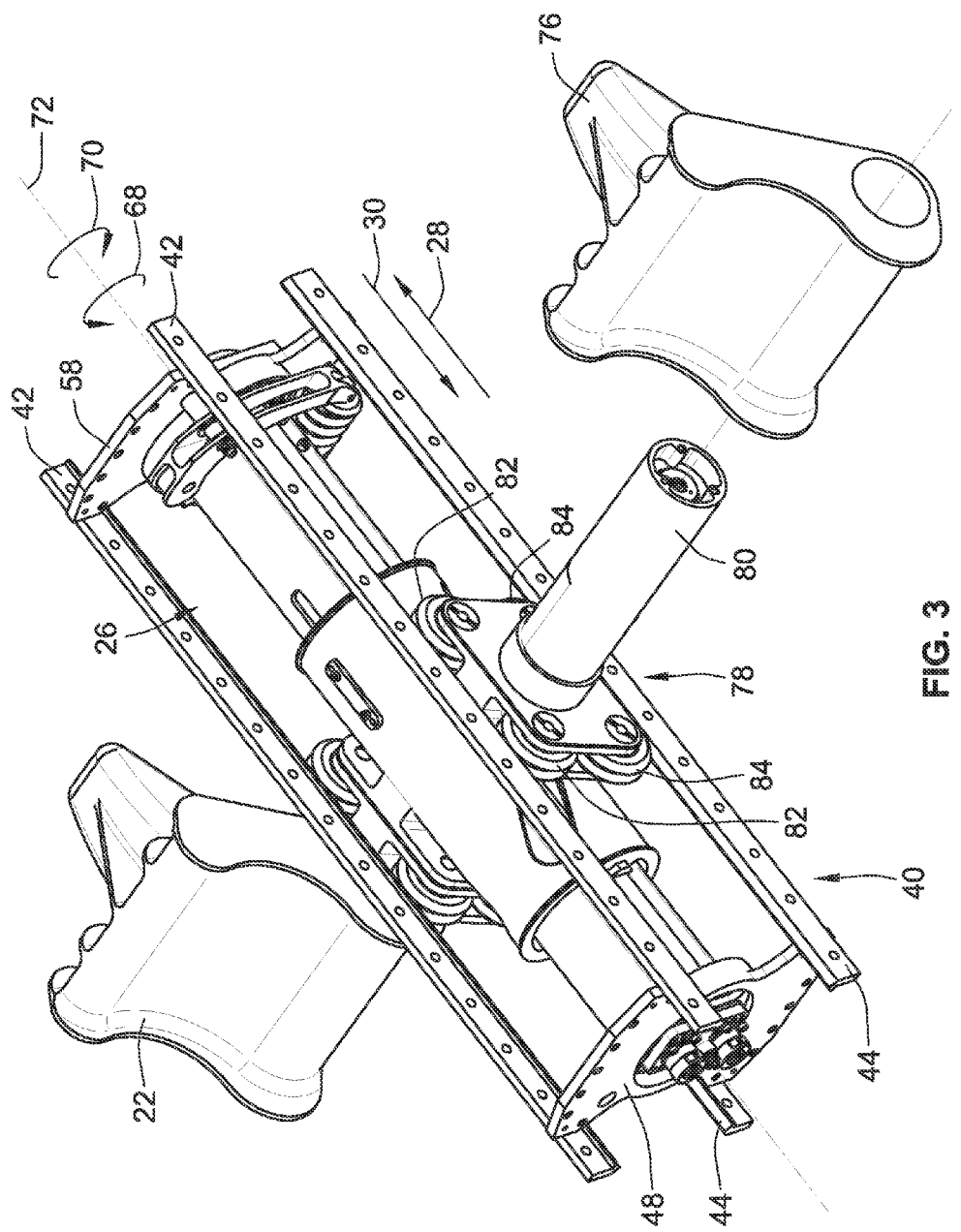
FIG. 3 is another perspective exploded view of the pedal assembly of FIG. 1.

Turning now to FIG. 3, each pedal assembly 22 includes a pedal 76 which is connected to a carriage assembly 78. Carriage assembly 78 includes a carriage 80 with a pair of upper wheels 82 and a pair of lower wheels 84 rotationally mounted thereto as shown. Although two upper wheels 82 and two lower wheels 84 are shown, a single upper/lower wheel or more than two upper/lower wheels may be utilized.

Upper wheels 82 are in rolling contact with upper rail 42. Lower wheels 84 are in rolling contact with lower rail 44. As a result, each pedal assembly 22 is slideable in first and second linear directions 28, 30 along upper and lower rails 42, 44. This linear pedal path is an advantageous improvement over prior designs which typically have an arcuate pedal path which can necessitate a larger space envelope for pedal movement as well as affect the overall ergonomics of pedal actuation. As briefly introduced above, this linear movement of each pedal assembly 22 is converted to a rotation about center longitudinal axis 72 of barrel cam arrangement 26 by virtue of the mechanical linkage between each pedal assembly 22 and barrel cam arrangement 26.

Figure 4:
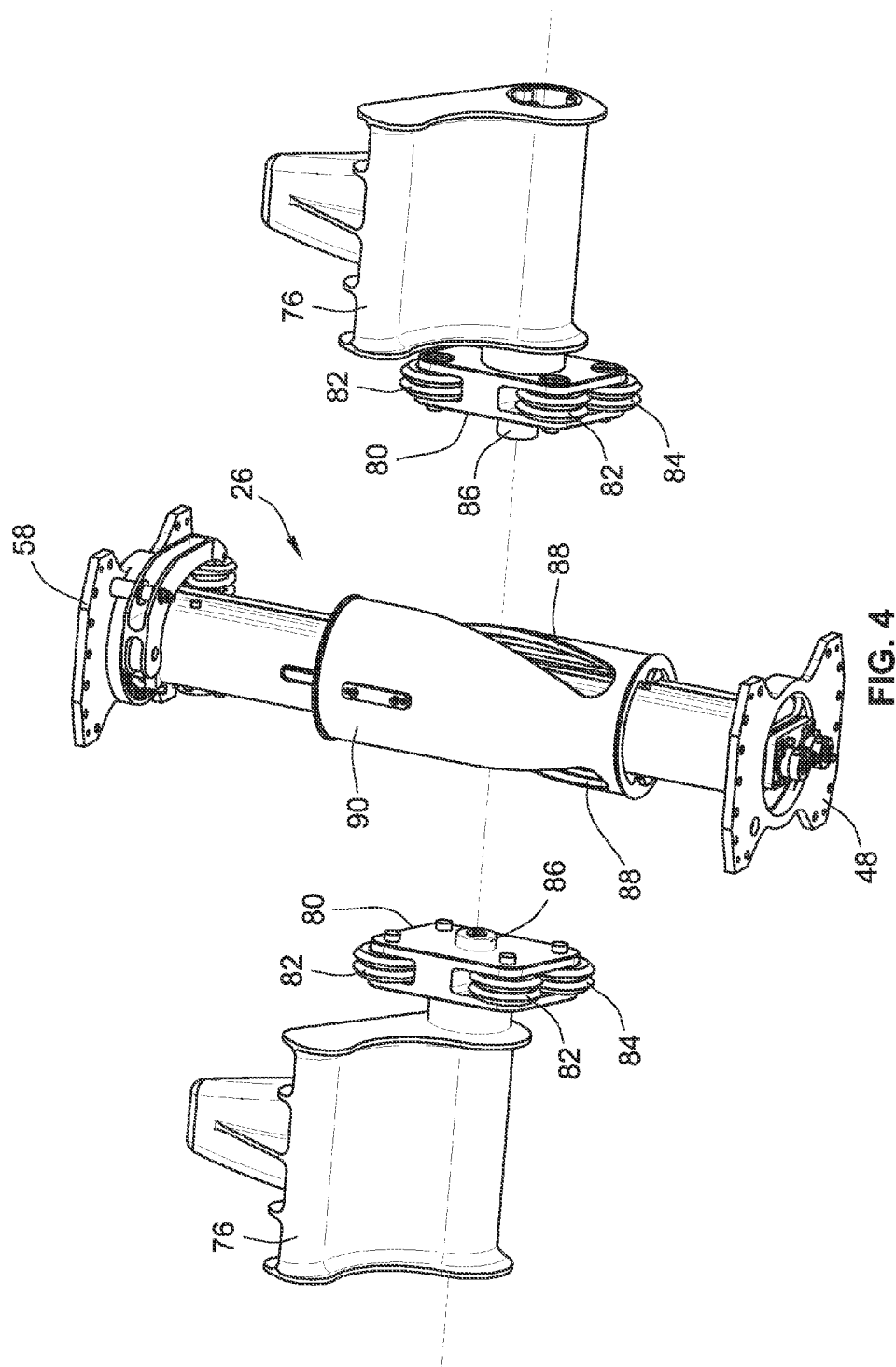
FIG. 4 is another perspective exploded view of the pedal assembly of FIG. 1.

Turning now to FIG. 4, the aforementioned mechanical linkage will now be discussed in greater detail. Each pedal assembly 22 includes a rolling cam follower 86 projecting from an interior surface of each carriage 80 as shown. This cam follower 86 is received within a cam groove 88 of a barrel cam 90 of barrel cam arrangement 26. As illustrated in FIG. 4, a cam groove 88 is disposed on either side of barrel cam 90 to receive its corresponding cam follower 86.

Figure 5:
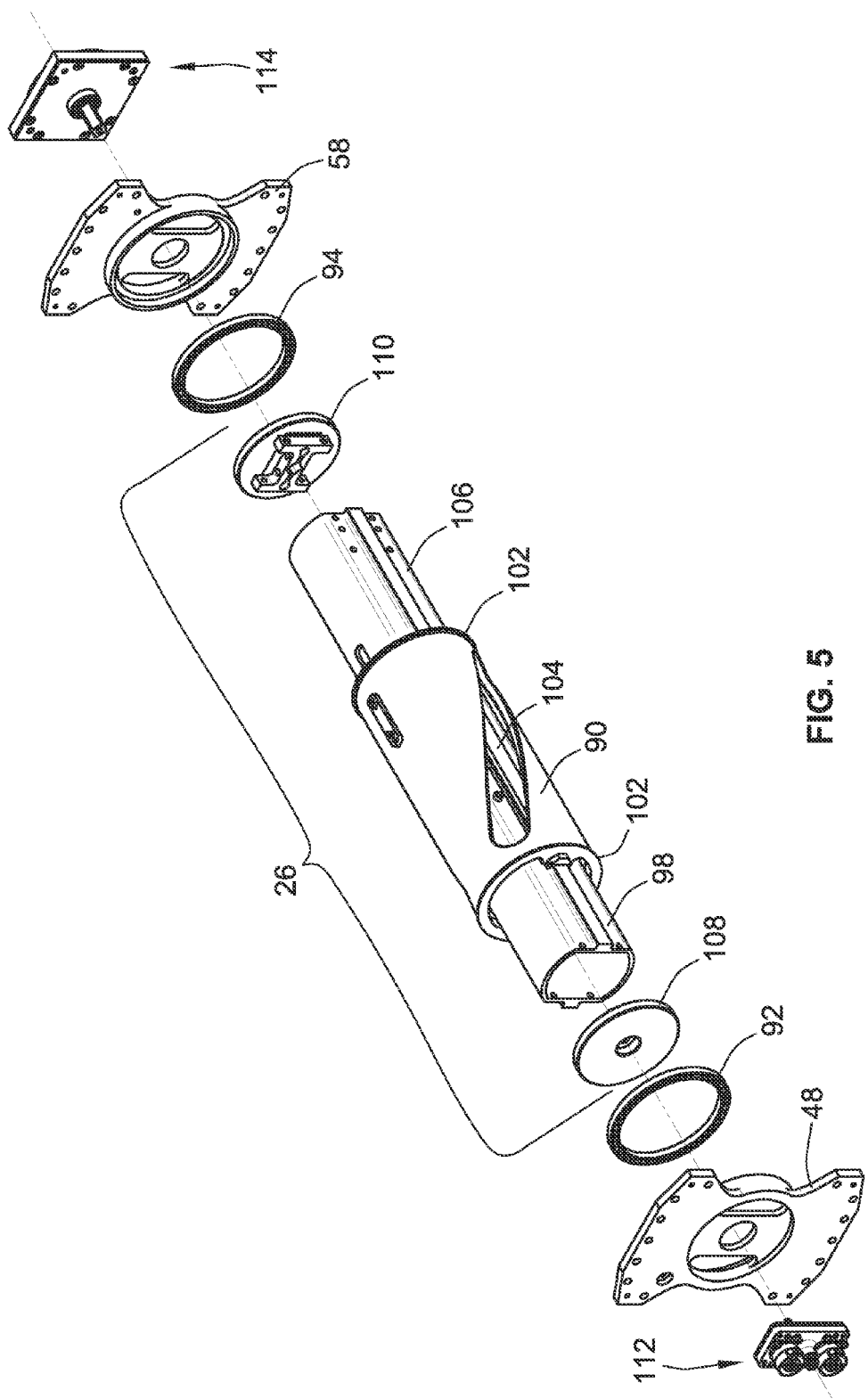
FIG. 5 is another perspective exploded view of the pedal assembly of FIG. 1.

With reference to FIG. 5, each cam groove 88 follows a generally arcuate path along barrel cam 90. The cam grooves 88 are symmetrically arranged about a central longitudinal axis of barrel cam 90. Those of skill in the art will recognize that the particular shape of the arcuate path of each cam groove 88 will dictate the amount of rotation about axis 72 per unit of linear movement of a pedal assembly 22. As such, the specific shape shown is for exemplary illustration only.

Barrel cam 90 is fixed relative to a translation tube 98 of barrel cam arrangement 26 during operation. As such, as cam follower 86 (See FIG. 4) is biased in either of first and second linear directions 28, 30 (See FIG. 3), the same causes a rotation of barrel cam 90 and translation tube 98. Put differently, cam follower 86 maintains a linear path as it travels along either of first or second linear directions 28, 30. To accommodate this linear path, barrel cam 90 and translation to 98 must rotate as defined by cam groove 88 to permit such linear movement.

With continued reference to FIG. 5, this rotation of barrel cam arrangement 26 is provided by way of first and second bearings 92, 94 situated at opposed ends of barrel cam arrangement 26 and mounted to first and second inner end plates 48, 58. Additionally, barrel cam arrangement 26 also includes end caps 108, 110 as shown. The previously introduced sensor arrangement 112 is mounted to first inner end plate 48 and coupled to end cap 108 such that rotation of end cap 108 with the remainder of barrel cam arrangement 26 is transmitted to the rotational sensors of sensor arrangement 112. In a similar manner, a damper 114 is mounted to second inner end plate 58 as shown. This damper is connected to end cap 110 such that a desired damping of barrel cam arrangement 26 may be achieved, e.g. when barrel cam arrangement 26 returns to its center position by way of a below-described centering mechanism.

Still referring to FIG. 5, a end cap plates 102 are mounted to opposed ends of barrel cam 90. These end cap plates 102 receive mounting bars 104 which are slideably disposed along mounting ribs 106 on opposed sides of translation tube 98. This configuration allows barrel cam 90 to slide linearly along the length of translation tube 98 to provide for an adjustment of the position of pedal assemblies 22 for ergonomic purposes.

Figure 6:
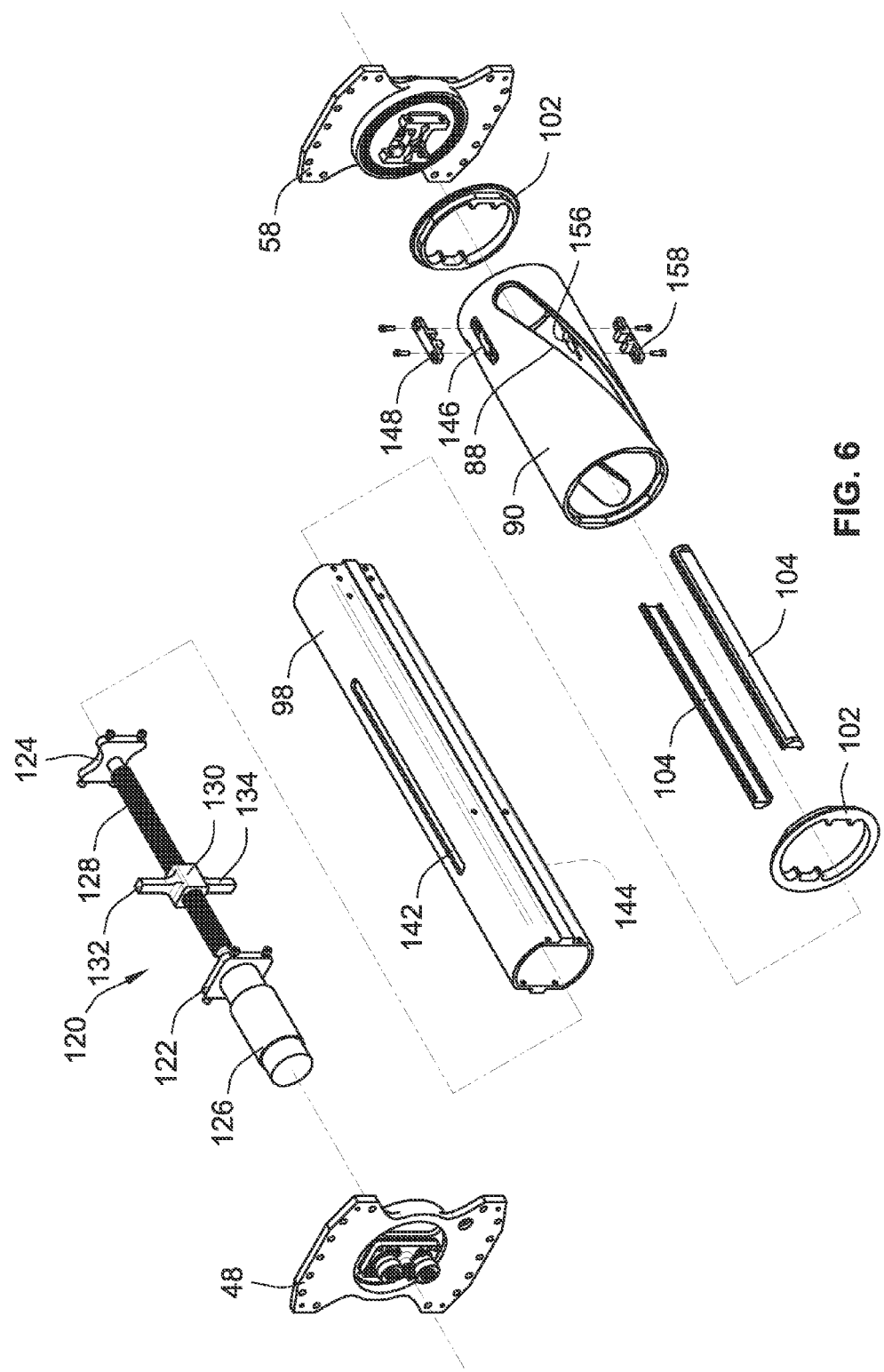
FIG. 6 is another perspective exploded view of the pedal assembly of FIG. 1.

Turning now to FIG. 6, the aforementioned ergonomic adjustment capabilities of pedal system 20 will be described in greater detail. An adjustment mechanism 120 is disposed internally within translation tube 98. Adjustment mechanism 120 includes end brackets 122, 124 which are utilized to mount the same within the interior of hollow translation tube 98. A motor 126 is mounted to end bracket 122 as shown. An acme screw 128 is mechanically coupled to the output of motor 126 at one end thereof, and at the other end thereof, is coupled to end bracket 124. Acme screw 128 is freely rotatable relative to end brackets 122, 124 as a result of an input torque provided by motor 126.

A nut block 130 is threaded onto acme screw 128. Nut block 130 includes an upper projection 132 as well as a lower projection 134. Upper projection 132 extends through an upper slot 142 formed in an upper surface of translation tube 98 as shown. Likewise, lower projection 134 extends through a lower slot 144 formed in translation tube 98 in an opposed spaced relation to upper slot 142. Upper projection 132 also extends through an upper aperture 146 formed in barrel cam 90. A bracket 148 is utilized to fixedly connect barrel cam 90 to upper projection 132. Likewise, lower projection 134 also extends through a lower aperture 156 formed in barrel cam 90. A bracket 158 is utilized to fixedly connect barrel cam 90 to lower projection 134.

Figure 7:
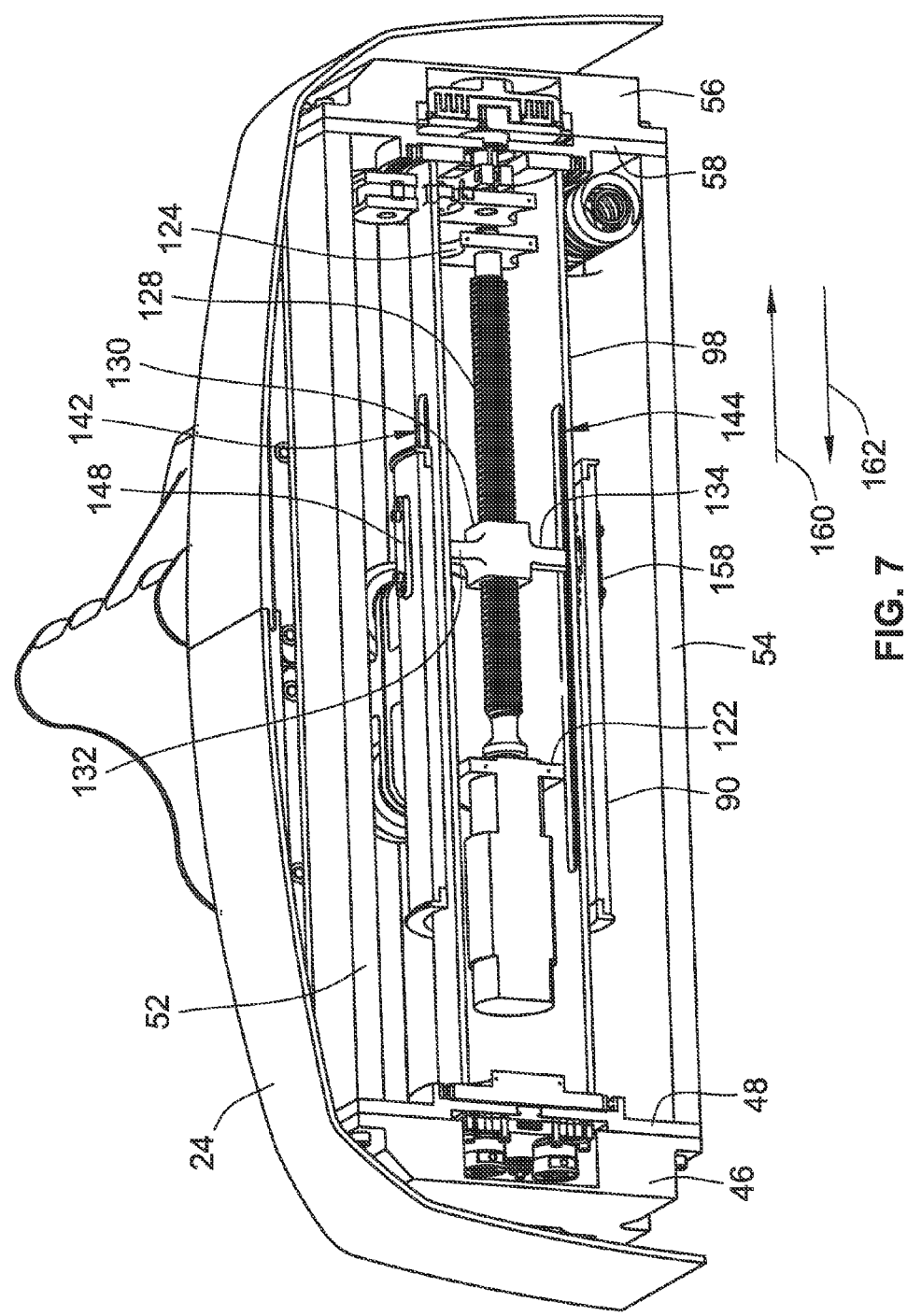
FIG. 7 is a perspective cross sectional view of the pedal assembly of FIG. 1.

Turning now to FIG. 7, a cross-section of the above-described arrangement is shown therein. As can be surmised from inspection of FIG. 7, nut block 130 and acme screw 128 thus provide a lead screw arrangement wherein rotation of acme screw 128 results in a linear movement of nut block 30 relative to translation tube 98. Given the above-described connection of barrel cam 90 to nut block 130, this rotation of acme screw 128 thus results in a linear adjustment in linear directions 160, 162 of barrel cam 90 relative to translation tube 98. Given the mechanical connection of each pedal assembly 22 to barrel cam 90 as described above, this linear movement of barrel cam 90 also results in a linear adjustment of the position of pedal assemblies 22. This allows for the ergonomic adjustment of pedal assemblies 22 relative to housing 24 to accommodate shorter or taller pilots as needed.

Figure 8:
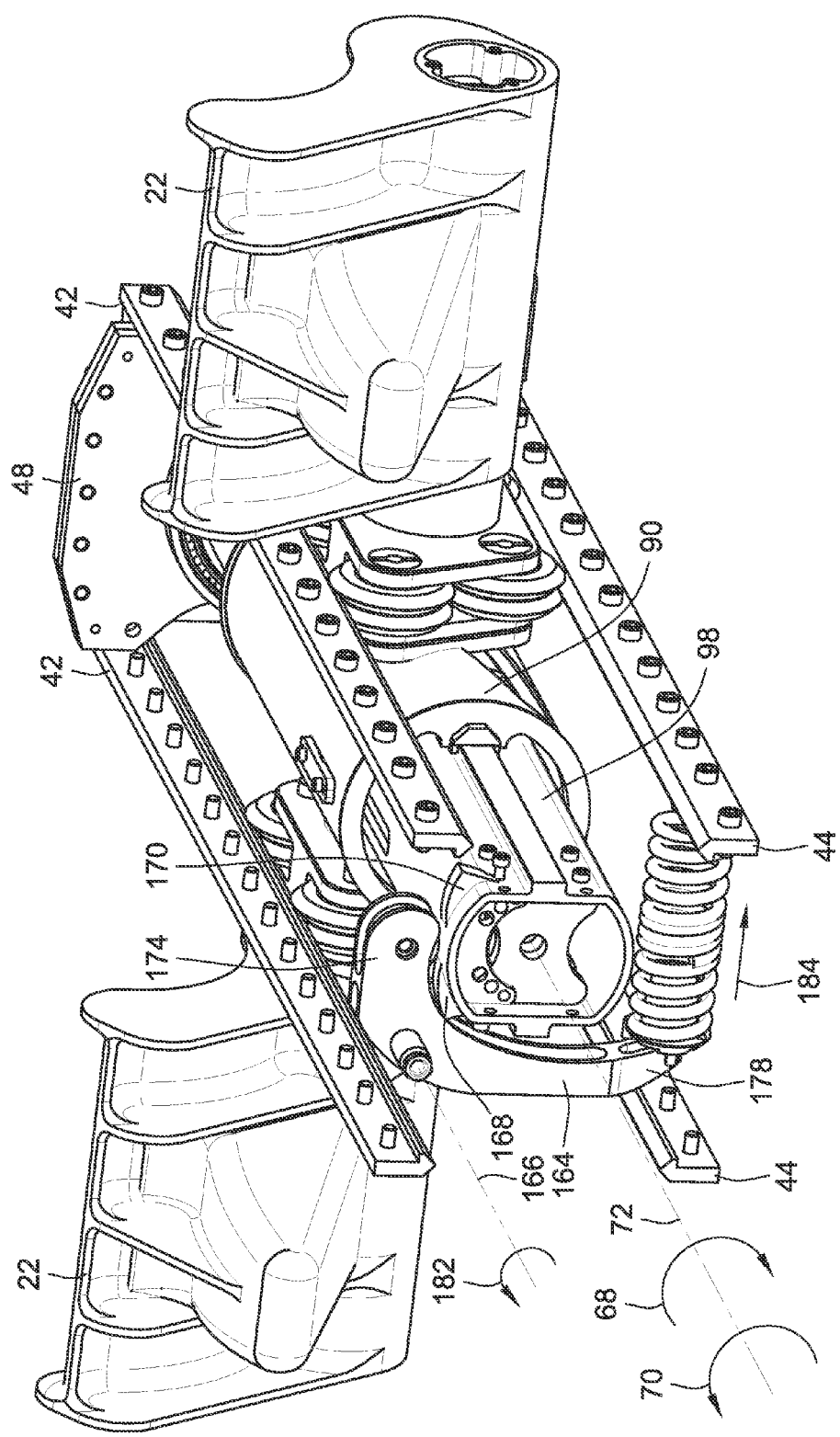
FIG. 8 is a partial perspective view of the pedal assembly of FIG. 1.

Turning now to FIG. 8, a centering mechanism is also mechanically connected to barrel cam arrangement 26 for automatically biasing barrel cam arrangement 26 back to its neutral position, i.e. a predefined orientation about center longitudinal axis 72 when no force is applied to either pedal assembly 22. This centering mechanism includes a rocker arm 164 which is rotationally mounted about a pivot axis 166 defined by a connection between rocker arm 164 and second inner end plate 58 which has been removed from FIG. 8 for purposes of clarity. A cam follower 168 is mounted at a first end 174 of rocker arm 164. This cam follower 168 is in rolling contact with a cam element 170 mounted adjacent an end of translation tube 98 as shown.

As can be seen in FIG. 8, cam element 170 includes partially convex portions with a central concave portion positioned therebetween. As barrel cam arrangement 26 is rotated in either of rotational direction 68, 70 about center longitudinal axis 72, cam follower 168 will be brought into contact with either of the convex portions of cam element 170. This movement will impart a rotation to rocker arm 164 about pivot axis 166 in rotational direction 182. Such a rotation will linearly compress a spring 180 in linear direction 184 which is connected to a second end 178 of rocker arm 164 as shown.

This has the effect of not only providing a back pressure or feel for a pilot as pedal assemblies 22 are depressed, but also provides for the return of barrel cam arrangement 26 to its neutral position wherein cam follower 168 is positioned within the concave portion of cam element 170 in the event that no pressure is being applied to pedal assemblies 22. The above-described damper 114 (See FIG. 5) acts to provide a sufficient dampening force as barrel cam arrangement 26 returns to its neutral position by way of the force applied by spring 180 to minimize or avoid any undesirable overshoot.

As described herein, pedal assembly 20 overcomes existing problems in the art by providing a compact design for a rudder pedal assembly. Indeed, pedal assembly 20 achieves this advantage in part by utilizing a barrel cam arrangement 26 as opposed to the conventional parallel tube arrangements described above. Such a configuration advantageously allows for a single rotational tube to provide the necessary rotation which is detected by rotational sensors to ultimately effectuate rudder position. This single tube arrangement also advantageously permits for the ergonomic adjustment of the associated pedal assemblies 22 of pedal system 20 by carrying an adjustment mechanism 120 within an interior space of this single tube configuration. As a result, a significant amount of space reduction is achieved as the overall footprint of pedal system 20 is significantly less than prior designs.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A rudder pedal system, comprising:
   an outer housing;
   a chassis assembly carried by the outer housing;
   a barrel cam arrangement rotationally mounted within an interior space of the chassis assembly;
   a pair of pedal assemblies mechanically coupled to the barrel cam arrangement such that linear movement of either of the pair of pedal assemblies results in a rotation of the barrel cam arrangement about a central longitudinal axis defined by the barrel cam arrangement.

2. The rudder pedal system of claim 1, wherein the barrel cam arrangement includes a barrel cam having a bore therethrough and a translation tube extending through the bore.

3. The rudder pedal system of claim 2, wherein the barrel cam includes a pair of cam grooves symmetrically arranged on the barrel cam about a center longitudinal axis thereof.

4. The rudder pedal system of claim 3, wherein each pedal assembly includes a carriage with a cam follower projecting therefrom, and wherein the cam follower of one pedal assembly is slidably received in one of the cam grooves, and wherein the cam follower of the other pedal assembly is slidably received in the other one of the cam grooves.

5. The rudder pedal system of claim 4, wherein each carriage carries at least one upper wheel, and at least one lower wheel.

6. The rudder pedal system of claim 5, wherein the chassis assembly includes an upper rail and a lower rail on a first side of the chassis assembly, and an upper rail and a lower rail on a second side of the chassis assembly, wherein the at least one upper wheel of each pedal assembly is respectively in rolling contact with the upper rails, and wherein the at least one lower wheel is respectively in rolling contact with the lower rails.

7. The rudder pedal system of claim 3, wherein each cam groove follows an arcuate path along the length of the barrel cam.

8. The rudder pedal system of claim 1, further comprising an adjustment mechanism disposed within the outer housing for adjusting a position of the pair of pedal assemblies relative to the outer housing.

9. The rudder pedal system of claim 8, wherein the barrel cam arrangement includes a barrel cam having a bore therethrough and a translation tube extending through the bore, and wherein the adjustment mechanism is mounted within an interior space of the translation tube.

10. The rudder pedal system of claim 9, wherein the adjustment mechanism includes is coupled to the barrel cam such that it is operable to adjust a linear position of the barrel cam relative to the translation tube.

11. A rudder pedal system, comprising:
    an outer housing;
    a chassis assembly within the outer housing, the chassis assembly including an upper and a lower rail on each of opposed sides of the chassis assembly;
    a pair of pedal assemblies, wherein one of the pair of pedal assemblies is in rolling contact the upper and lower rails on one side of the opposed sides of the chassis assembly, and wherein the other one of the pair of pedal assemblies is in rolling contact with the upper and lower rails on the other one of the opposed sides of the chassis assembly; and
    a barrel cam arrangement rotationally mounted within an interior space of the chassis assembly, wherein each of the pair of pedal assemblies is mechanically coupled to the barrel cam arrangement.

12. The rudder pedal system of claim 11, wherein the pair of pedal assemblies mechanically coupled to the barrel cam arrangement such that linear movement of either of the pair of pedal assemblies results in a rotation of the barrel cam arrangement about a central longitudinal axis defined by the barrel cam arrangement.

13. The rudder pedal assembly of claim 11, further comprising a sensor arrangement operably connected to the barrel cam arrangement to detect a rotation of the barrel cam arrangement about a central longitudinal axis of the barrel cam arrangement.

14. The rudder pedal assembly of claim 11, further comprising a centering mechanism operably connected to the barrel cam arrangement to return the barrel cam arrangement to a neutral position from a rotated position about a central longitudinal axis of the barrel cam arrangement.

15. The rudder pedal assembly of claim 14, further comprising a dampening mechanism operably connected to the barrel cam arrangement to dampen a rotation of the barrel cam arrangement about a central longitudinal axis of the barrel cam arrangement.

16. The rudder pedal system of claim 11, wherein the barrel cam arrangement includes a barrel cam having a bore therethrough and a translation tube extending through the bore.

17. The rudder pedal assembly of claim 16, wherein the barrel cam includes a pair of cam grooves symmetrically arranged on the barrel cam about a center longitudinal axis thereof.

18. The rudder pedal system of claim 17, wherein each cam groove follows an arcuate path along the length of the barrel cam.

19. A method of manufacturing a rudder pedal system, the method comprising the steps of:

providing an outer housing;

providing a chassis assembly within the outer housing;

providing a barrel cam arrangement within an interior space of the chassis assembly by rotationally mounting the barrel cam arrangement to the chassis assembly; and mechanically coupling a pair of pedal assemblies to the barrel cam arrangement such that linear movement of either of the pair of pedal assemblies results in a rotation of the barrel cam arrangement about a central longitudinal axis defined by the barrel cam arrangement.

20. The method of claim 19, wherein the step of providing the barrel cam arrangement includes providing a barrel cam having a bore therethrough and a translation tube extending through the bore.

\* \* \* \* \*